United States Patent
Horesh

(10) Patent No.: US 11,645,618 B1
(45) Date of Patent: May 9, 2023

(54) METHOD AND APPARATUS FOR MONITORING INVENTORY ITEMS

(71) Applicant: Intuit Inc., Mountain View, CA (US)

(72) Inventor: Yair Horesh, Kfar-Saba (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/083,244

(22) Filed: Dec. 16, 2022

(51) Int. Cl.
  *G06Q 10/08* (2023.01)
  *G06Q 10/087* (2023.01)
(52) U.S. Cl.
  CPC .................................. *G06Q 10/087* (2013.01)
(58) Field of Classification Search
  CPC .................................................. G06Q 10/087
  See application file for complete search history.

(56) References Cited

U.S. PATENT DOCUMENTS

| | | | |
|---|---|---|---|
| 8,108,271 B1 | 1/2012 | Duncan et al. | |
| 8,346,630 B1 | 1/2013 | McKeown | |
| 8,744,923 B1 | 6/2014 | McKay et al. | |
| 9,898,713 B1 | 2/2018 | Blank et al. | |
| 2012/0084119 A1 | 4/2012 | Vandehey et al. | |
| 2012/0158482 A1 | 6/2012 | Paradise et al. | |
| 2021/0224582 A1* | 7/2021 | Afshar | G06N 20/10 |

* cited by examiner

*Primary Examiner* — Paul Danneman
(74) *Attorney, Agent, or Firm* — Paradice & Li LLP

(57) ABSTRACT

Systems and methods for monitoring items in publicly available inventories, such as websites, are disclosed. Items to be monitored in the publicly available inventories are identified based on embeddings obtained for the inventory items. For example, matching inventory items may be identified based on proximity of the embeddings, such as the cosine distance between embeddings, or a classification machine learning model may be trained to infer matches, e.g., based the embeddings as well as information related to the user and source of the publicly available inventories. The inventory items in the publicly available inventories may be monitored to detect changes which may be reported. Feedback related to the match between inventory items may be used to adjust one or more parameters used for matching.

20 Claims, 4 Drawing Sheets

METHOD AND APPARATUS FOR MONITORING INVENTORY ITEMS

BACKGROUND

Search engines employed on computing systems are used to carry out searches on publicly available databases, e.g. network sites such as Internet sites or website. By way of example, vertical search engines may be used to search a specific segment of online content to mine data available databases or open directories. Examples of segments of online content that may be searched include shopping, travel, securities, real estate, job listings, and informative, such as legal information and medical information.

Search engines often use algorithms on a web crawler or focused crawler to index relevant information on pre-defined topics. The pre-defined topics typically need to be very specifically identified by the user. Search engines, for example, used for tracking or comparing items typically require a user to specifically identify the item to be tracked or compared. The user may be required to provide a URL (Uniform Resource Locator) that identifies the item to be tracked or compared. Some search engines may permit key word searches for items, but the user still selects the desired item or items to be tracked or compared.

Specific identification of items to be searched is useful as it ensures relevant results for the user. However, because items to be searched are specifically identified, the results will not include similar but different items, subsequently added items, or replacement items. Consequently, to receive comprehensive results with such search engines, a burden is placed on the user to specifically identify all relevant items and to continuously update the items to include any new or changing items. Thus, conventionally techniques for ensuring accurate comprehensive searches for items are manual, cumbersome, and inefficient.

As such, a significant improvement for searching and monitoring items is therefore desired.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a computer-implemented method for monitoring inventory items in publicly available inventories. The method includes obtaining embeddings for at least one item and matching the at least one item with at least one inventory item in the publicly available inventories based on the embeddings. The method further includes monitoring changes associated with the at least one inventory item in the publicly available inventories over time. The method further includes reporting the changes associated with the at least one inventory item in the publicly available inventories.

Another innovative aspect of the subject matter described in this disclosure can be implemented as a system for monitoring inventory items in publicly available inventories. The system may include one or more processors and memory storing instructions. When executed by the one or more processors, the instructions may cause the system to obtain embeddings for at least one item and to match the at least one item with at least one inventory item in the publicly available inventories based on the embeddings. The system may be further caused to monitor changes associated with the at least one inventory item in the publicly available inventories over time. The system may be further caused to report the changes associated with the at least one inventory item in the publicly available inventories.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

Figure 1:
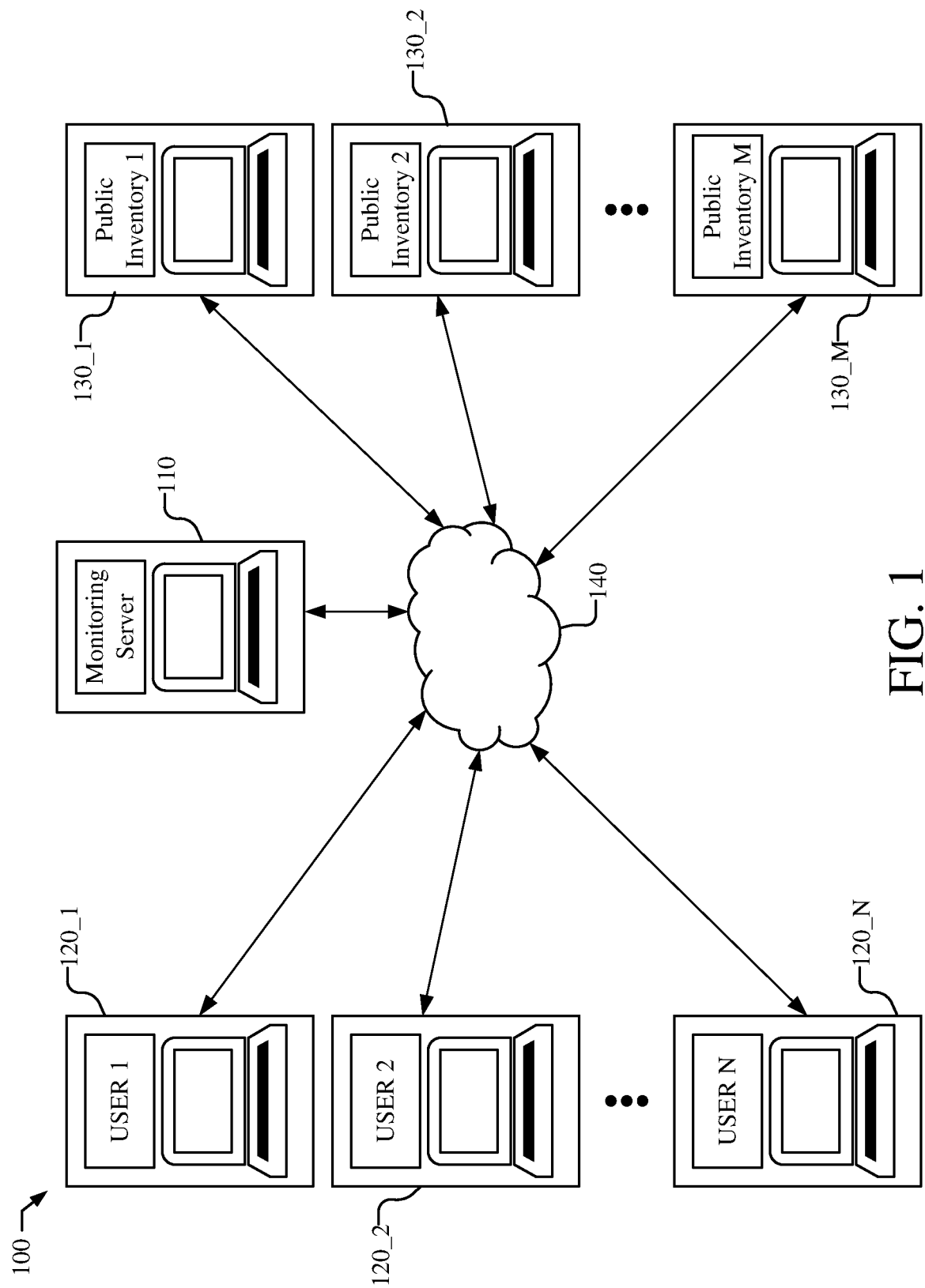
FIG. 1 shows a block diagram of a system for an implementation of monitoring at least one inventory item in publicly available inventories, as discussed herein.

Specific implementations will now be described in detail with reference to the accompanying figures. Like elements in the various figures are denoted by like reference numerals for consistency. In the following detailed description, numerous specific details are set forth in order to provide a more thorough understanding of the present disclosure. However, it will be apparent to one of ordinary skill in the art that aspects of the disclosure may be practiced without these specific details. In other instances, well-known features have not been described in detail to avoid unnecessarily complicating the description.

Search engines often use algorithms on a web crawler or focused crawler to index relevant information on pre-defined topics. The pre-defined topics typically need to be very specifically identified by the user. Search engines, for example, used for tracking or comparing items typically require a user to specifically identify the item to be tracked or compared. The user may be required to provide a URL (Uniform Resource Locator) that identifies the item to be tracked or compared. Some search engines may permit key word searches for items, but the user still selects the desired item or items to be tracked or compared.

Publicly available resources may be searched and monitored using tools such as website crawlers or scraping. Website crawling or scraping automatically collects large amounts of data from websites. Relevant information, however, may be only a small portion of the data collected. One problem with acquiring data through the use of website scraping or crawling is that it requires a user to be very precise and explicit about what items to look for in the large amounts of data. Items in the publicly available resources, however, may periodically change. For example, items in the publicly available resources may change over time due to changes in the item name or identification information (e.g., stock-keeping unit (SKU)), items may be replaced with similar (but different) items, new items may be added, etc. Moreover, similar but different items may be present in the publicly available resources. Accordingly, conventional techniques that use website scraping or crawling to monitor items in publicly available resources, may result in significantly incomplete information and may require substantial and periodic human intervention in order to precisely identify the items to be monitored.

As discussed herein, comprehensive searching and monitoring of items in publicly available resources, sometimes referred to herein as publicly available inventories, may be implemented based on machine learning techniques, and specifically, the use of embeddings. Embeddings, for example, may be a mapping of a discrete, categorical variable to a vector of continuous numbers. Accordingly, rather than specifically identifying the item to be searched and monitored, the user, for example, may provide some description of the item (e.g., text, context, images) from which embedding vectors may be obtained. The publicly available inventories may be searched based on proximity of the embeddings for the item to be searched and the items in the publicly available inventories to find the same or similar items in the inventory. Accordingly, the burden on the user to specifically identify all relevant items to be monitored in the inventory and to continuously update to catch any changes in the inventory may be alleviated.

In implementations discussed herein, items in publicly available inventories are monitored by obtaining embeddings for an inventory item. The embeddings, for example, may be based on text, e.g., name, title, description, etc., based on one or more images of the item, or a combination thereof. The inventory item may be matched to an item in publicly available inventories based on the embeddings. For example, embeddings of the items in the publicly available inventories are obtained and proximity may be determined based on a cosine distance between the embeddings, e.g., a cosine similarity greater than a predetermined threshold may be considered a match. In some implementations, the match may be inferred using a machine learning algorithm that is trained based on historical matching data and that may use features, such as the embeddings and proximity, as well as information related to the user and source of the publicly available inventories. Changes associated with the item in the publicly available inventories are monitored over time, e.g., at desired time intervals. When changes associated with matched items in the publicly available inventories are detected, e.g., change in information, availability, etc., the changes may be reported to the relevant users. In some implementations, feedback related to the match may be received and used to adjust the matching process. For example, the predetermined threshold for determining a match may be altered. In another example, the feedback may be used for training or retraining the machine learning algorithm for inferring a match.

FIG. 1 shows a block diagram of a system 100 for an implementation of monitoring at least one inventory item in publicly available inventories, as discussed herein. The system 100 as illustrated with a monitoring server 110, computing systems 120_1, 120_2, . . . 120_N (sometimes collectively referred to as computing systems 120) that are used by users, and computing systems 130_1, 130_2, . . . 130_M (sometimes collectively referred to as computing systems 130) used by entities, through which publicly available inventories are made available. The monitoring server 110, computing systems 120, and computing systems 130 may be connected via network 140, which may be any network or network system such as a Local Area Network (LAN), a Wide Area Network (WAN), a public network, such as the Internet, a private network, or other network capable of allowing communication between two or more computing systems, whether available or known at the time of filing or as later developed.

The computing systems 120 are used by users, labeled User1, User 2 . . . User N, to access the monitoring server 110 (and optionally the publicly available inventories made available via computing systems 130) via the network 140. The user may be any entity that desires to monitor an item in the publicly available inventories. The user, for example, may be an entity that desires to monitor online content, such as information related to products or services, travel, securities, real estate, job listings, and information, such as legal information and medical information. In one specific, but non-limiting, implementation, a user may be a merchant (e.g., a small or medium business (SMB), that as used herein, is a business entity that sells inventory items, and may maintain a physical store at a geographic location, in which customers visit to purchase items, or may sell items to customers via a network site (e.g., Internet site, website), e.g., via the computing systems 120 or other computing systems, e.g., servers, etc., not shown. The computing systems 120 may be used by the users to communicate and interact, via the network 140, with the monitoring server 110, e.g., with an inventory monitoring application hosted on the monitoring server 110. By way of example, each of the computing systems 120 may be used by an associated user to identify items to the monitoring server 110 for monitoring in publicly available inventories, to receive reports regarding any changes in matching inventory items in publicly available inventories that are detected by the monitoring server 110, and to provide feedback to the monitoring server 110. The computing systems 120 may be used by an associated user further to identify any publicly available inventories that may include matching inventory items and/or to identify items within the publicly available inventories that match. For example, a user may provide a list of inventory items to the monitoring server 110 that may identify the inventory items by text, context, images or other appropriate manner. The reports regarding matching inventory items in publicly available inventories may be received periodically and may be received directly from the monitoring server 110, e.g., reports may be received from the inventory monitoring application hosted on the monitoring server 110, or indirectly, e.g., reports may be received through email or other similar communication service. A user may provide feedback to the monitoring server 110 to adjust parameters related to the report, such as muting or downgrading alerts, for future reports. The user may additionally or alternatively provide feedback to the monitoring server 110 related to the matching inventory items, e.g., to indicate when the user believes an inventory item from the publicly available inventories in the report does not match a corresponding inventory item from the user.

Computing systems 130 may be used by entities that maintain publicly available inventories of items and are labeled Public Inventory 1, Public Inventory 2, . . . Public Inventory M, accordingly. Items in the publicly available inventories, for example, may include products or services, travel, securities, real estate, job listings, and information, such as legal information and medical information. In one specific, but non-limiting, implementation, entities that use computing systems 130 may be merchants, such as large corporations, that compete against any of User 1, User2, . . . User N. The computing systems 130, for example, may be servers through which inventory items from the publicly available inventories are sold to customers via a network site (e.g., Internet site, website) via the network 140.

The monitoring server 110 may be a computing system or a number of computing systems that communicate and interact with one or more entities through computing systems 120 and may access publicly available inventories via computing systems 130 via the network 140, or in some implementations via different networks. The monitoring server 110 may host an inventory monitoring application as discussed herein. The monitoring server 110, for example, may receive information identifying inventory items, such as text, context, or images, from one or more users via computing systems 120.

The monitoring server 110 may access one or more of the publicly available inventories via computing systems 130 and may identify matching inventory items, i.e., inventory items in the publicly available inventories that are the same or similar to the inventory items identified by the one or more users, and may monitor changes to matching inventory items over time. For example, the monitoring server 110 may identify matching inventory items based embeddings obtained from the inventory items identified by the users and the in the publicly available inventories. The monitoring server 110 may additionally or alternatively identify matching inventory items using a machine learning model trained using historical matching data. The monitoring server 110, for example, may monitor changes in information or availability of matching inventory items in the publicly available inventories.

The monitoring server 110 may report the changes when activity is detected, e.g., quantitative information, such as a price, changes greater than a specified threshold, or a change in availability such as the addition or removal of inventory items. For example, the monitoring server 110 may provide a report to the relevant users, e.g., through the inventory monitoring application hosted on the monitoring server 11, or indirectly by sending a report to the relevant users, e.g., via email or other communication service.

The monitoring server 110 may receive feedback from the one or more users via the computing systems 120 and network. The feedback, for example, may be used to alter how reports are generated, e.g., by adjusting frequency of reports, adjusting change thresholds, or other parameters to trigger an alert. The feedback may additionally or alternatively be used to indicate that the match between inventory items is incorrect. The monitoring server 110 may use the feedback to adjust the matching procedure and/or the report generation.

Various aspects of the present disclosure provide a unique computing solution to monitoring inventory items in publicly available inventories that did not exist prior to the creation of machine learning models. The use of embeddings, for example, allows optimized matching of a target object, e.g., the item identified by a user, to the same or similar object out of hundreds, thousands, or even millions, of objects, e.g., a same or similar inventory item in the publicly available inventories, to accurately identified items to be monitored in the publicly available inventories. Such an immense number of potential matches (which may be in the thousands or millions) cannot be performed in the human mind, much less using pen and paper. In addition, such machine learning technology as described herein cannot be performed in the human mind, much less using pen and paper. As such, implementations of the subject matter disclosed herein are not an abstract idea such as organizing human activity or a mental process that can be performed in the human mind.

Figure 2:
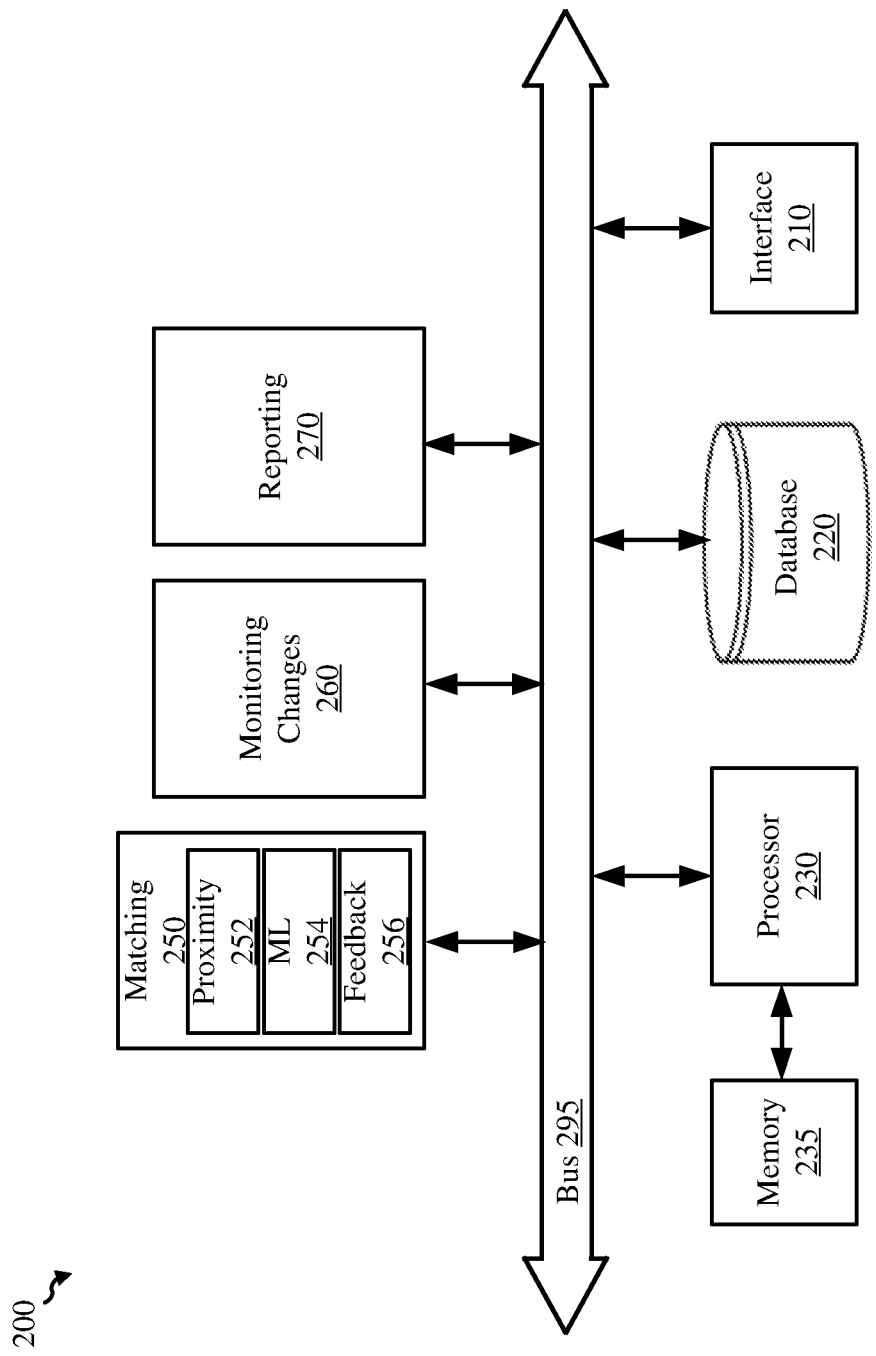
FIG. 2 shows an example computing system that may be used for monitoring at least one inventory item in publicly available inventories, according to some implementations.

FIG. 2 shows an example computing system 200 that may be used for monitoring at least one inventory item in publicly available inventories, according to some implementations. The computing system 200, for example, may be used as the monitoring server 110 shown in FIG. 1. The system 200 includes an interface 210, a database 220, a processor 230, a memory 235 coupled to the processor 230, a matching model 250, a monitoring changes module 260, and a reporting module 270. In some implementations, the various components of the system 200 may be interconnected by at least a data bus 295, as depicted in the example of FIG. 2. In other implementations, the various components of the system 200 may be interconnected using other suitable signal routing resources.

The system 200 is configured to solve matching problems using the matching model 250. As noted above, target objects may be items that are identified, e.g., by one or more users, to be matched with inventory items to be monitored in a publicly available inventory, and the objects to be matched and monitored may be the same or similar inventory items in one or more publicly available inventories.

While many of the examples in describing operations of the computing system 200 for matching of inventory items and monitoring changes of matched inventory items in publicly available inventories are related to products sold by merchants for clarity in explaining aspects of the present disclosure, the computing system 200 may be configured to perform matching for various other types of objects as well. For example, in some implementations, the target objects and objects may be items such as services, securities, such as stocks, bonds, mutual funds, etc., or real estate listings, including residential and commercial, job listings, travel information, legal information and medical information, etc.

The interface 210 may be one or more input/output (I/O) interfaces to obtain information from one or more users, e.g., via network 140 and computing systems 120 shown in FIG. 1, to identify items to be monitored in publicly available inventories, including text, context, or figures. The items, for example, may be in the inventory of the user and an inventory list may be provided by the user. The one or more users may further identify publicly available inventories that may include matching inventory items, and may further identify items within the publicly available inventories that match. The interface 210 may additionally be one or more I/O interfaces to scan publicly available inventories, e.g., via network 140 and computing systems 130 shown in FIG. 1. The interface 210, for example, may be used for scraping the publicly available inventories at desired time intervals. An example interface may include a wired interface or wireless interface to the internet or other means to communicably couple with other devices. For example, the interface 210 may include an interface with an ethernet cable or a wireless interface to a modem, which is used to communicate with an internet service provider (ISP) directing traffic to and from other devices (such as a user's local computing system and computing systems or servers for accessing the publicly available inventories). In some implementations, the interface 210 may further include a display, a speaker, a mouse, a keyboard, or other suitable input or output elements that allow interfacing with administrators.

The database 220 may store data obtained by the interface 210 and determined by the processor 230, matching model 250, monitoring changes module 260, and reporting module 270. For example, the database 220 may store information provided by users, via the interface 210. For example, for each user, the database 220 may store identifying information for inventory items, embeddings obtained for the inventory items, identification of relevant publicly available inventories identification of matching items in publicly available inventories, historical information of the matching items (e.g., previous availability and quantitative information), an indication of whether a change has occurred, a report of changes, etc. The database 220 may further store data obtained from the publicly available inventories, including data from scraping of the publicly available inventories, via the interface 210. The stored data from scraping publicly available inventories may be used to monitor inventory items for multiple users. The database 220 may further store instructions for the system 200 for matching inventory items, monitoring changes in inventory items, reporting changes in the inventory items, or other computer executable instructions or data for operation of the system 200. In some implementations, the database 220 may include a relational database capable of presenting information (such as matches and changes in inventory items determined by the computing system 200) as data sets in tabular form and capable of manipulating the data sets using relational operators. The database 220 may use Structured Query Language (SQL) for querying and maintaining the database 220.

The processor 230 may include one or more suitable processors capable of executing scripts or instructions of one or more software programs stored in system 200 (such as within the memory 235). For example, the processor 230 may be capable of executing one or more applications or the matching model 250, monitoring changes module 260, and reporting module 270. The processor 230 may include a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the processors 230 may include a combination of computing devices (such as a combination of a DSP and a microprocessor, a plurality of microprocessors, one or more microprocessors in conjunction with a DSP core, or any other such configuration).

The memory 235, which may be any suitable persistent memory (such as non-volatile memory or non-transitory memory) may store any number of software programs, executable instructions, machine code, algorithms, and the like that can be executed by the processor 230 to perform one or more corresponding operations or functions. For example, the memory 235 may store the one or more applications or the matching model 250, monitoring changes module 260, and reporting module 270 that may be executed by the processor 230. The memory 235 may also store inventory items, embeddings for inventory items, identification of matching inventory items, identification of changes in matching inventory items (such as quantitative information or availability changes), reports of changes in matching inventory items, feedback related to the matching inventory items, or any other data for operation of the matching model 250, monitoring changes module 260, and reporting module 270. In some implementations, hardwired circuitry may be used in place of, or in combination with, software instructions to implement aspects of the disclosure. As such, implementations of the subject matter disclosed herein are not limited to any specific combination of hardware circuitry and/or software.

The system 200 uses the matching model 250 to match inventory items identified by one or more users, to items in one or more publicly available inventories. The matching model 250, for example, may be used by the system 200, for example, to obtain embeddings for the inventory items, e.g., both the inventory items identified by a user and each inventory item in the publicly available inventories, which may be scraped, e.g., via a Python scraper or other appropriate scraper, and stored in database 220. Embeddings are numerical representations of the inventory items that are expressed as vectors. The vector space quantifies the semantic similarity between categories. Accordingly, embeddings that are close to each other may be considered similar. By way of example, matching model 250 may be used to create two types of embeddings. If a text description of the inventory item is provided, e.g., a name, title, description, etc., the embeddings may be created using a language model, Bidirectional Encoder Representations from Transformers (BERT) model, an XLNet model, a Robustly optimized BERT approach (RoBERTa) model, A Lite BERT (ALBERT) model, a Distilled version of BERT (DistilBERT) model, or a suitable unidirectional transformer. If images of the inventory item are provided, the embeddings may be created based on the images using a residual neural network (ResNet). If both textual and image based embeddings are available, an average of the embeddings may be generated. The same type of embeddings is obtained for both the inventory item identified by the user and the inventory items in the publicly available inventories.

The system 200 may use the proximity module 252 to identify matching inventory items based on the proximity of the embeddings. For example, the proximity may be calculated using the proximity module 252 as the cosine distance of two corresponding embeddings, i.e., the embeddings from the inventory item identified by the user and an inventory item in the publicly available inventory. The cosine similarity may be compared to a predetermined threshold to determine if the inventory items match. For example, the predetermined threshold may be 80%. In some implementations, different types of inventory items, or inventory items with embeddings determine in different manners may use different predetermined thresholds to determine a match.

The system 200 may additionally or alternatively use a machine learning (ML) model 254 to identify matching inventory items based on the embeddings, e.g., based on the proximity of the embeddings. The ML model 254, for example, may be classifier model, such as a Siamese Neural Network classifier or xgBoost classifier that may be trained based on historical matching data. For example, in some implementations, the system 200 may initially match inventory items based on proximity using the proximity module 252, and with a number of matches and mismatches accumulated, the ML model 254 may be trained to determine if two inventory items should be matched or not. The features input to the ML model 254, for example, may include the embedding of the inventory item; the embedding of the inventory item from the publicly available inventory; the category, names and descriptions of the two inventory items; user related data such as the user's industry, 2 digits prefix of its zip code, etc.; information related to the publicly available inventory source such as the name, 2 digits prefix of its zip code; and the cosine similarity matching score for the embeddings. The label may be a binary indication if there is a match or not. In some implementations, a confidence level for the classification may be produced and if a match is associated with a confidence level that is below a predetermined threshold, e.g., 70%, the ML model 254 may determine that there is no match.

The matching model 250 may adjust one or more parameters for matching inventory items based on historical matching data and using multi-armed bandit trails. For example, the predetermined threshold used with the cosine similarity to determine whether embeddings are proximate or the ML model 254 trained or retrained based on historical data or multi-armed bandit trails. For example, in some implementations, the multi-armed bandit trails may be implemented when some users, have matches determined are based on one policy (or set of parameters the model uses to determine matches) and other users, have matches determined based on a different policy. The MAB trails may be used to suggest transitions in the policy used for determining matches for one or both groups of users based on such ongoing experiments, including the resulting matches and feedback.

Additionally, the system 200 may receive feedback with respect to the matches. The feedback, for example, may be provided by the user after a report of changes to matching inventory times is provided. The system 200 may use a feedback module 256 to adjust the matching procedure. For example, the predetermined threshold used with a cosine similarity used by the proximity module 252 to determine a match may be adjusted. For example, the predetermined threshold may be decreased over time until a user indicates that the inventory items do not match. Conversely, a user indicates that the inventory items do not match, the predetermined threshold may be increased until the user indicates that the inventory items match or no longer indicates that there is a mismatch. The feedback module 256 may be used with the ML model 254, e.g., by accumulating matches and mismatches that may be used to train and retrain the ML model 254 on an ongoing basis, e.g., after every time interval. Additionally or alternatively, the predetermined threshold for the confidence level for the classification may be adjusted based on the feedback.

The system 200 is configured to monitor changes in matching items using the monitoring changes module 260. The system 200, for example, may scan one or more publicly available inventories every time interval, e.g., each day, every other day, once a week, etc., and may compare current quantitative information and/or availability of items in a publicly available inventory with previous quantitative information and/or availability in the publicly available inventory. The monitoring changes module 260 may be used to determine if a change has occurred, e.g., the availability of an item has occurred (either added or removed) or if the quantitative information has changed by more than a threshold amount. It should be understood that both the determination of matching items and monitoring for changes may be performed at every time interval. Feedback provided by a user may be used to adjust parameters for monitoring changes. For example, the feedback may be used to adjust a change threshold for the quantitative information to trigger a change alert.

The system 200 is configured by a reporting module 270 to generate a report indicating when a change in matching items is detected. The report, for example, may indicate the matching inventory items, e.g., both the inventory item identified by the user and the inventory item in the publicly available inventory that is determined to be matching, as well as a description of the change. The report, for example, may be capable of sorted and filtered by a user. Reports may be provided to each user, with each user receiving a report on only relevant inventory items, i.e., inventory items associated with that user. The report may be transmitted to the relevant user by the system 200 or may be made available to the user through the system 200. Feedback provided by a user may be used to adjust parameters for reporting changes. For example, the feedback may be used to mute reports, mute reporting of specific items, or adjust the interval that reports are provided.

While the matching model 250, monitoring changes module 260, and reporting module 270 are depicted as separate components of the system 200 in FIG. 2, the matching model 250, monitoring changes module 260, and reporting module 270 may be included in software including instructions stored in memory 235 or the database 220, may include application specific hardware (e.g., one or more ASICs), or a combination of the above. As such, the particular architecture of the system 200 shown in FIG. 2 is but one example of a variety of different architectures within which aspects of the present disclosure may be implemented. In addition, in other implementations, components of the system 200 may be distributed across multiple devices, may be included in fewer components, and so on. While the examples herein are described with reference to system 200, any suitable system may be used to perform the operations described herein.

If the matching model 250, monitoring changes module 260, and reporting module 270 are implemented in software, the matching model 250, monitoring changes module 260, and reporting module 270 may be implemented using any suitable computer-readable language. For example, matching model 250 for obtaining embeddings and the ML model 254 (such as the classification models), may be programmed in the Python programming language using any suitable libraries. For example, the matching model 250 for obtaining embeddings may be programmed using the Fast-Bert Python library and a classification model may be programmed using the XGBoost Python library.

Figure 3:
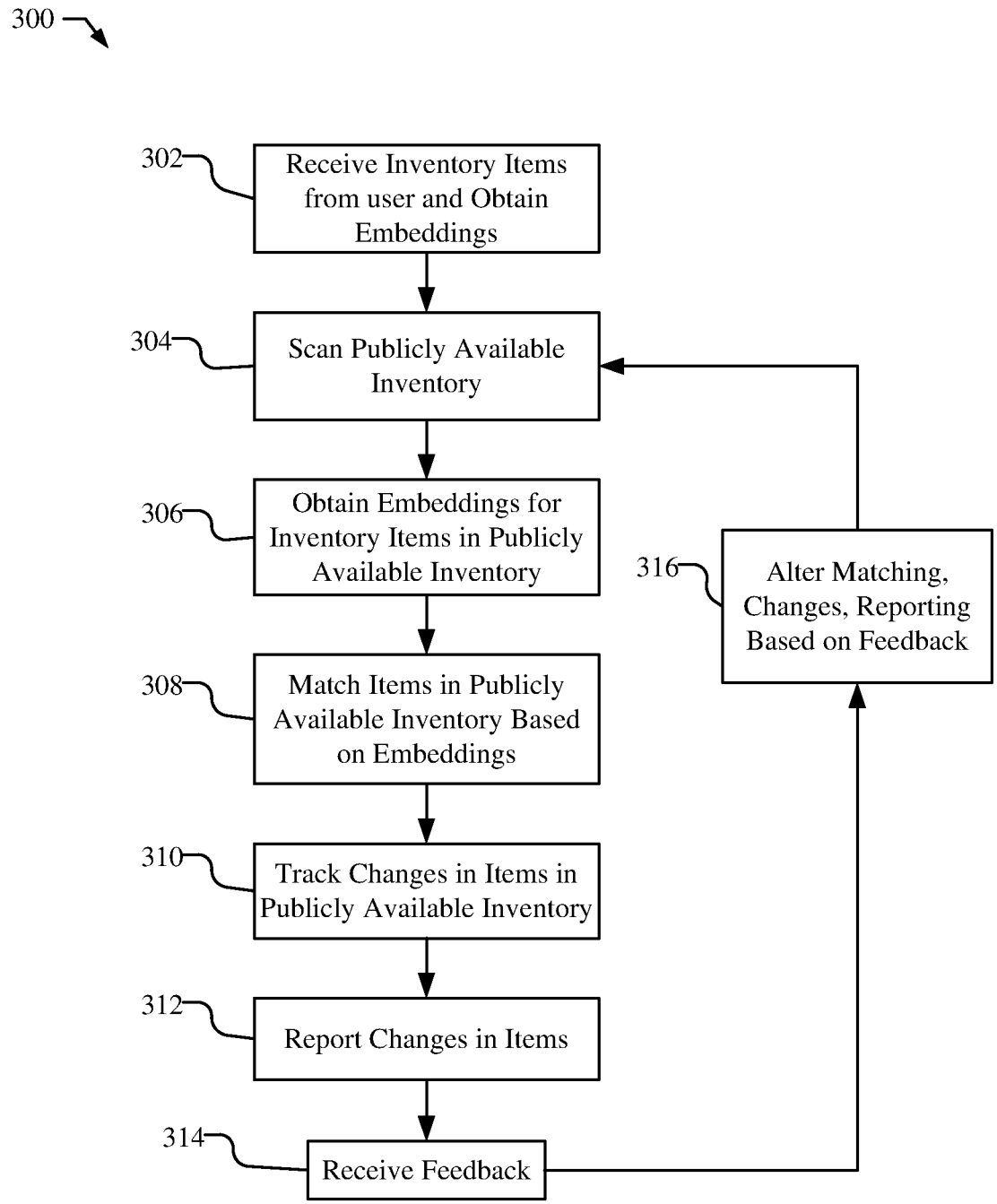
FIG. 3 shows an illustrative flow chart depicting an example operation of a computing system for monitoring at least one inventory item in publicly available inventories, according to some implementations.

FIG. 3 shows an illustrative flow chart depicting an example operation 300 of a computing system for monitoring at least one inventory item in publicly available inventories, according to some implementations. The operation 300 is described as being performed by the computing system 200 shown in FIG. 2 for clarity and is an example of the operation of the monitoring server 100 shown in FIG. 1. The computing system performing operation 300, for example, may include the matching model 250, monitoring changes module 260, and reporting module 270.

At 302, the system 200 receives (such as by the interface 210) inventory items to be monitored in publicly available inventories. The inventory items, for example, may be identified by a user by text, context, or figures. For example, the inventory items may be identified by name, title, description, SKU number, images, etc. Matching model 250 may be used by system 200 for obtaining embeddings of the inventory items are obtained, e.g., using a language model for text descriptions, or based on the images, or a combination thereof, e.g., text based embeddings and image based embeddings may be averaged. The inventory items, for example, may be provided by one or more users, accessing the system 200 via the interface 210.

At 304, the system 200 scans (e.g., via the interface 210) one or more publicly available inventories, which in some implementations are identified by the user via interface 210. For example, the publicly available inventories may be websites that are scraped and stored in the database 220. Each scan of a publicly available inventory may be utilized for multiple users.

At 306, the system 200 obtains (using matching model 250) embeddings for inventory items in a publicly available inventory, e.g., using a language model for text descriptions, or based on the images, or a combination thereof, e.g., text based embeddings and image based embeddings may be averaged. In some implementations, the system 200 may obtain embeddings for the inventory items in the publicly available inventory in the same manner used to obtain embeddings for the inventory items in block 302.

At 308, the system 200 (e.g., using proximity module 252 and/or ML model 254) matches the inventory items identified in block 302 with the same or similar items in the publicly available inventory based on the embeddings. The matching inventory items may be identified based the proximity of the embedding vectors, using proximity module 252. For example, the proximity may be calculated as the cosine distance between the embeddings from an inventory item identified in block 302 and an item in the publicly available inventory. The cosine distance may be compared to a predetermined threshold, which may be adjustable, to identify a match, e.g., a cosine distance greater than 80% may be considered a match. Additionally, or alternatively, a matching inventory items may be identified using a classifier ML model 254, such as a Siamese Neural Network classifier or xgBoost classifier. The ML model 254 may be trained based on historical matching data, e.g., from the proximity matching and feedback from the user. For example, inventory items may be matched initially based on proximity, and with accumulated matches and mismatches, the ML model 254 may be trained to determine if two inventory items are a match. The ML model 254 may use features, such as the embeddings of the inventory items, category, names and descriptions of the inventory items; data related to the user, such as the inductor and 2 digits prefix of its zip code, data related to the online source data (i.e., source of the publicly available inventory), such as the name and 2 digits prefix of its zip code; and the cosine similarity matching score for the embeddings, and the label may be a binary indication if there is a match or not. The ML model 254 may generate a confidence level, where a match that is below a predetermined threshold for the confidence level may be cancelled, i.e., considered to be a mismatch.

At 310, the system 200 tracks changes in the matched items in the publicly available inventory, e.g., using the monitoring changes module 260. The system 200, for example, may compare current information for a matched inventory item, e.g., current quantitative information (such as price, dates, etc.) and/or availability, with previous information for the matched inventory item, which may be stored in database 220. An alert may be triggered if a change is determined to have occurred, e.g., a change in the availability of an item has occurred (either added or removed) or if the quantitative information has changed by more than a threshold amount.

At 312, the system 200 reports changes in matched items, e.g., using the reporting module 270. The report, for example, may be sent to a user via interface 210 or may be made available to a user who accesses the system 200 to obtain the report. Relevant reports may be provided to each respective user. The user, for example, may be able to sort and filter the report. The report may identify all of the matching inventory items or only the matching inventory items which have an identified change, along with a description of the change.

It should be understood that blocks 304, 306, 308, and 310 may each be performed together at a desired interval, e.g., daily, every other day, once a week, etc.

At 314, the system 200 may receive feedback, via the interface 210, with respect to the matching inventory items or report. For example, a user may provide feedback with respect to the matching of the inventory items, e.g., indicate if a determined match of inventory items is correct or incorrect. In some implementations, the feedback may be with respect to the changes tracked, such as whether a change threshold should be increased or decreased. In some implementations, the feedback may be with respect to the report, such as whether items within the report should be reported, or whether the frequency of the reports should be altered.

At 316, the system 200 may alter one or more parameters based on the feedback. For example, the system 200 may alter the matching process, e.g. by changing the proximity threshold and/or retraining the ML model 254 based on feedback, e.g. using feedback module 256. The system 200 may further alter the changes tracked, e.g. by adjusting a threshold for quantitative information. The system 200 may further the time interval at which blocks 304, 306, 308, and 310 are performed to adjust the frequency of reports. In some implementations, multi-armed bandit trails may be used, e.g., with different matching parameters being used for different users, and feedback from the users being used to adjust matching parameters of other users.

Figure 4:
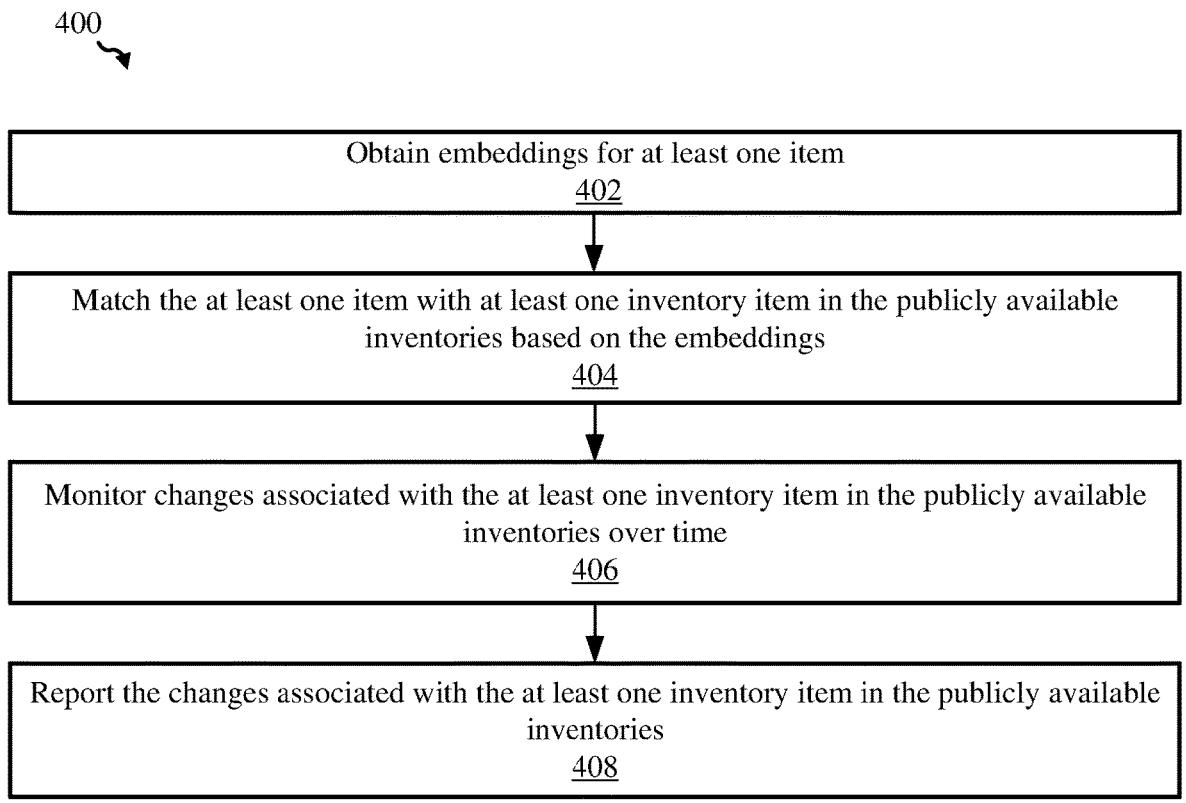
FIG. 4 shows an illustrative flow chart depicting a computer-implemented method of monitoring at least one inventory item in publicly available inventories, according to some implementations.

FIG. 4 shows an illustrative flow chart depicting a computer-implemented method 400 of monitoring at least one inventory item in publicly available inventories, according to some implementations. The method 400, for example, may perform one or more aspects of operation 300 shown in FIG. 3 and may be performed by the computing system 200 shown in FIG. 2 or monitoring server 100 shown in FIG. 1.

At block 402, the computer system may obtain embeddings for at least one item, e.g., as described in reference to matching model 250 in FIG. 2 and block 302 of FIG. 3.

At block 404, the computer system may match the at least one item with at least one inventory item in the publicly available inventories based on the embeddings, e.g., as described in reference to matching model 250, including proximity module 252 and/or ML model 254, in FIG. 2 and block 308 of FIG. 3.

At block 406, the computer system may monitor changes associated with the at least one inventory item in the publicly available inventories over time, e.g., as described in reference to the monitoring changes module 260 in FIG. 2 and block 310 of FIG. 3.

At block 408, the computer system may report the changes associated with the at least one inventory item in the publicly available inventories, e.g., as described in reference to reporting module 270 and block 312 of FIG. 3.

In some implementations, the computer system may receive feedback associated with matching the at least one item with the at least one inventory item in the publicly available inventories based on the embeddings, e.g., as described in reference to matching model 250, including feedback module 256, in FIG. 2 and block 314 of FIG. 3. The computer system may further adjust the matching of the at least one item with the at least one inventory item in the publicly available inventories based on based on the feedback, e.g., as described in reference to matching model 250, including feedback module 256, in FIG. 2 and block 316 of FIG. 3.

In some implementations, the computer system may match the at least one item with at least one inventory item in the publicly available inventories is based on proximity of the embeddings by determining cosine distances between the embeddings for the at least one item and embeddings for inventory items in the publicly available inventories, e.g., as described in reference to matching model 250, including proximity module 252, in FIG. 2 and block 308 of FIG. 3. The computer system may determine a match between the at least one item with the at least one inventory item in the publicly available inventories if the respective cosine distance is greater than a predetermined threshold, e.g., as described in reference to matching model 250, including proximity module 252, in FIG. 2 and block 308 of FIG. 3. Additionally, in some implementations, the computer system may adjust the predetermined threshold for determining a match of the at least one item with the at least one inventory item in the publicly available inventories based on feedback received in response to the report, e.g., as described in reference to matching model 250, including proximity module 252, in FIG. 2 and block 308 of FIG. 3.

In some implementations, the computer system may match the at least one item with at least one inventory item in the publicly available inventories based on the embeddings by inferring a match of the at least one item with at least one inventory item in the publicly available inventories using a machine learning classification model trained to match the at least one item with at least one inventory item in the publicly available inventories based on historical matching data, e.g., as described in reference to matching model 250, including ML model 254, in FIG. 2 and block 308 of FIG. 3. Additionally, in some implementations, the computer system may periodically retrain the wherein the machine learning classification model, e.g., as described in reference to matching model 250, including ML model 254, in FIG. 2 and block 308 of FIG. 3.

In some implementations, the computer system may monitor changes associated with the at least one inventory item in the publicly available inventories over time by comparing a current state with a previous state for the at least one inventory item in the publicly available inventories, e.g., as described in reference to the monitoring changes module 260 in FIG. 2 and block 310 of FIG. 3.

In some implementations, the matching the at least one item with at least one inventory item in the publicly available inventories based on the embeddings may be based on a predetermined threshold that is adjusted based on historical data and multi-armed bandit trials, e.g., as described in reference to matching model 250, including proximity module 252 and/or ML model 254, in FIG. 2 and block 316 of FIG. 3.

In some implementations, the changes associated with the at least one inventory item in the publicly available inventories may be at least one of quantitative information and availability, e.g., as described in reference to the monitoring changes module 260 in FIG. 2 and block 310 of FIG. 3.

In some implementations, the computer system obtains the embeddings for at least one item based on at least on of text related to the at least one item and one or more images of the at least one item, e.g., as described in reference to matching model 250 in FIG. 2 and block 302 of FIG. 3.

In some implementations, the embeddings are obtained for at least one item from a plurality of users, and the changes associated with the at least one item in the publicly available inventories are reported to the plurality of users, e.g., as described in reference to matching model 250 and reporting module 270 in FIG. 2 and block 302 and 312 of FIG. 3.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c, and "one or more of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations to be performed in performing aspects of the present disclosure, one or more operations may be performed in any order or concurrently to perform the described aspects of the disclosure. In addition, or to the alternative, a depicted operation may be split into multiple operations, or multiple operations that are depicted may be combined into a single operation. Thus, the claims are not intended to be limited to the implementations shown herein but are to be accorded the widest scope consistent with this disclosure, the principles, and the novel features disclosed herein.

What is claimed is:

1. A computer-implemented method for monitoring inventory items in publicly available inventories, comprising:
    obtaining embeddings for at least one item;
    matching the at least one item with at least one inventory item in the publicly available inventories based on the embeddings;
    monitoring changes associated with the at least one inventory item in the publicly available inventories over time; and
    reporting the changes associated with the at least one inventory item in the publicly available inventories.

2. The computer-implemented method of claim 1, further comprising:
    receiving feedback associated with matching the at least one item with the at least one inventory item in the publicly available inventories based on the embeddings; and
    adjusting the matching of the at least one item with the at least one inventory item in the publicly available inventories based on based on the feedback.

3. The computer-implemented method of claim 1, wherein matching the at least one item with the at least one inventory item in the publicly available inventories is based on proximity of the embeddings comprising:
    determining cosine distances between the embeddings for the at least one item and embeddings for inventory items in the publicly available inventories; and
    determining a match between the at least one item with the at least one inventory item in the publicly available inventories if the respective cosine distance is greater than a predetermined threshold.

4. The computer-implemented method of claim 3, further comprising adjusting the predetermined threshold for determining a match of the at least one item with the at least one inventory item in the publicly available inventories based on feedback received in response to the reporting.

5. The computer-implemented method of claim 1, wherein matching the at least one item with the at least one inventory item in the publicly available inventories based on the embeddings comprises inferring a match of the at least one item with the at least one inventory item in the publicly available inventories using a machine learning classification model trained to match the at least one item with the at least one inventory item in the publicly available inventories based on historical matching data.

6. The computer-implemented method of claim 5, further comprising periodically retraining the machine learning classification model.

7. The computer-implemented method of claim 1, wherein monitoring changes associated with the at least one inventory item in the publicly available inventories over time comprises comparing a current state with a previous state for the at least one inventory item in the publicly available inventories.

8. The computer-implemented method of claim 1, wherein matching the at least one item with the at least one inventory item in the publicly available inventories based on the embeddings is based on a predetermined threshold that is adjusted based on historical data and multi-armed bandit trials.

9. The computer-implemented method of claim 1, wherein the changes associated with the at least one inventory item in the publicly available inventories comprise at least one of quantitative information and availability.

10. The computer-implemented method of claim 1, wherein obtaining the embeddings for at least one item is based on at least on of text related to the at least one item and one or more images of the at least one item.

11. The computer-implemented method of claim 1, wherein the embeddings are obtained for at least one item from a plurality of users, and wherein the changes associated with the at least one item in the publicly available inventories are reported to the plurality of users.

12. A system for monitoring inventory items in publicly available inventories, comprising:
    one or more processors; and
    a memory storing instructions that, when executed by the one or more processors, causes the system to:
        obtain embeddings for at least one item;
        match the at least one item with at least one inventory item in the publicly available inventories based on the embeddings;
        monitor changes associated with the at least one inventory item in the publicly available inventories over time; and
        report the changes associated with the at least one inventory item in the publicly available inventories.

13. The system of claim 12, wherein the instructions further cause the system to:
    receive feedback associated with matching the at least one item with the at least one inventory item in the publicly available inventories based on the embeddings; and
    adjust the matching of the at least one item with the at least one inventory item in the publicly available inventories based on based on the feedback.

14. The system of claim 12, wherein the system is caused to match the at least one item with the at least one inventory item in the publicly available inventories based on proximity of the embeddings by being configured to:
    determine cosine distances between the embeddings for the at least one item and embeddings for inventory items in the publicly available inventories; and
    determine a match between the at least one item with the at least one inventory item in the publicly available inventories if the respective cosine distance is greater than a predetermined threshold.

15. The system of claim 14, wherein the instructions further cause the system to adjust the predetermined threshold for determining a match of the at least one item with the at least one inventory item in the publicly available inventories based on feedback received in response to the report.

16. The system of claim 12, wherein the system is caused to match the at least one item with the at least one inventory item in the publicly available inventories based on the embeddings by being configured to infer a match of the at least one item with the at least one inventory item in the publicly available inventories using a machine learning classification model trained to match the at least one item with the at least one inventory item in the publicly available inventories based on historical matching data.

17. The system of claim 12, wherein the system is caused to monitor changes associated with the at least one inventory item in the publicly available inventories over time by being configured to compare a current state with a previous state for the at least one inventory item in the publicly available inventories.

18. The system of claim 12, wherein the system is caused to match the at least one item with the at least one inventory item in the publicly available inventories based on the embeddings based on a predetermined threshold that is adjusted based on historical data and multi-armed bandit trials.

19. The system of claim 12, wherein the changes associated with the at least one inventory item in the publicly available inventories comprise at least one of quantitative information and availability.

20. The system of claim 12, wherein the embeddings are obtained for at least one item from a plurality of users, and wherein the changes associated with the at least one item in the publicly available inventories are reported to the plurality of users.

* * * * *